Figure 1:
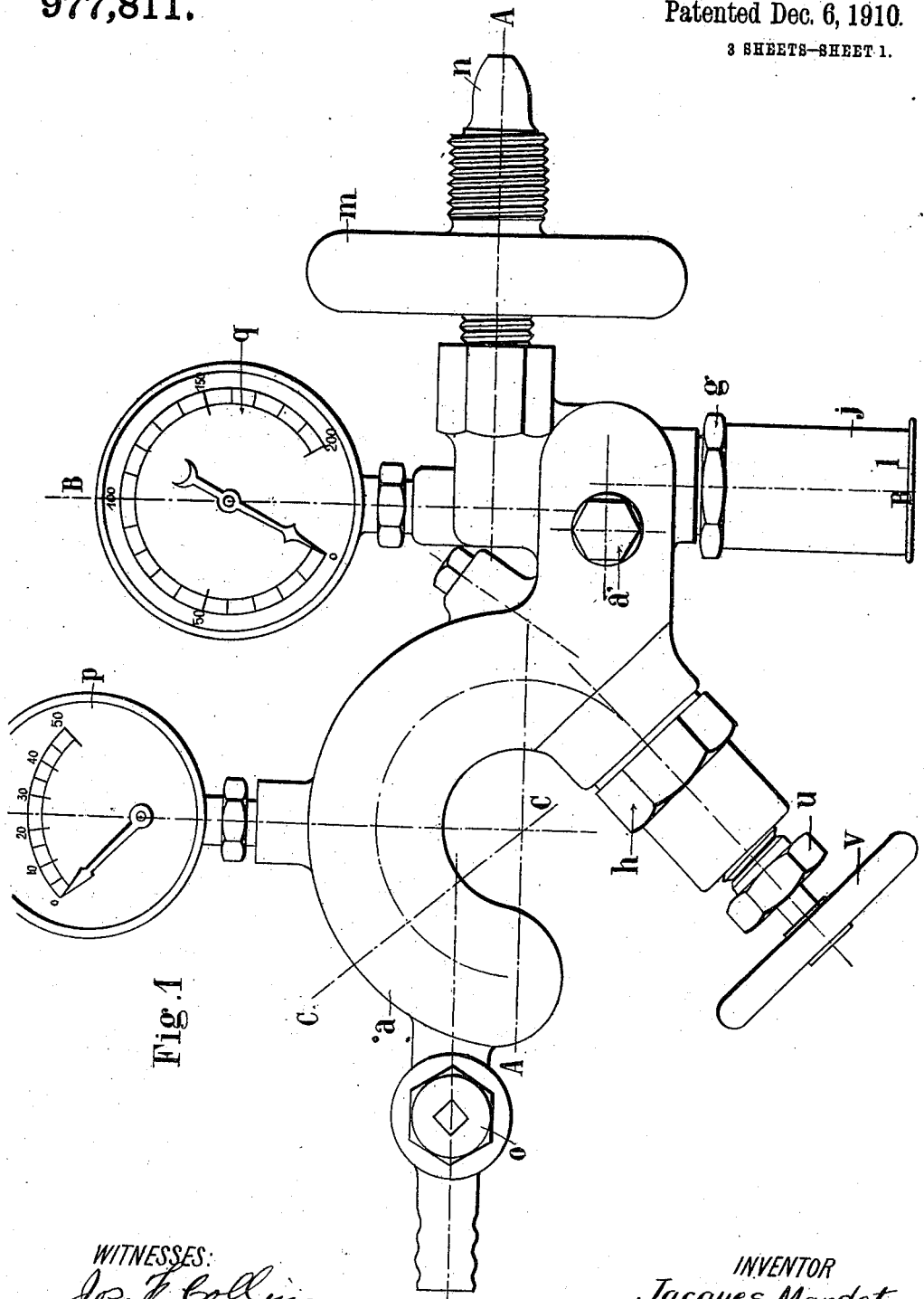

J. MANDET.
PRESSURE REGULATOR.
APPLICATION FILED MAY 26, 1909.

977,811.

Patented Dec. 6, 1910.
3 SHEETS—SHEET 1.

WITNESSES:

INVENTOR
Jacques Mandet.
BY
ATTORNEY.

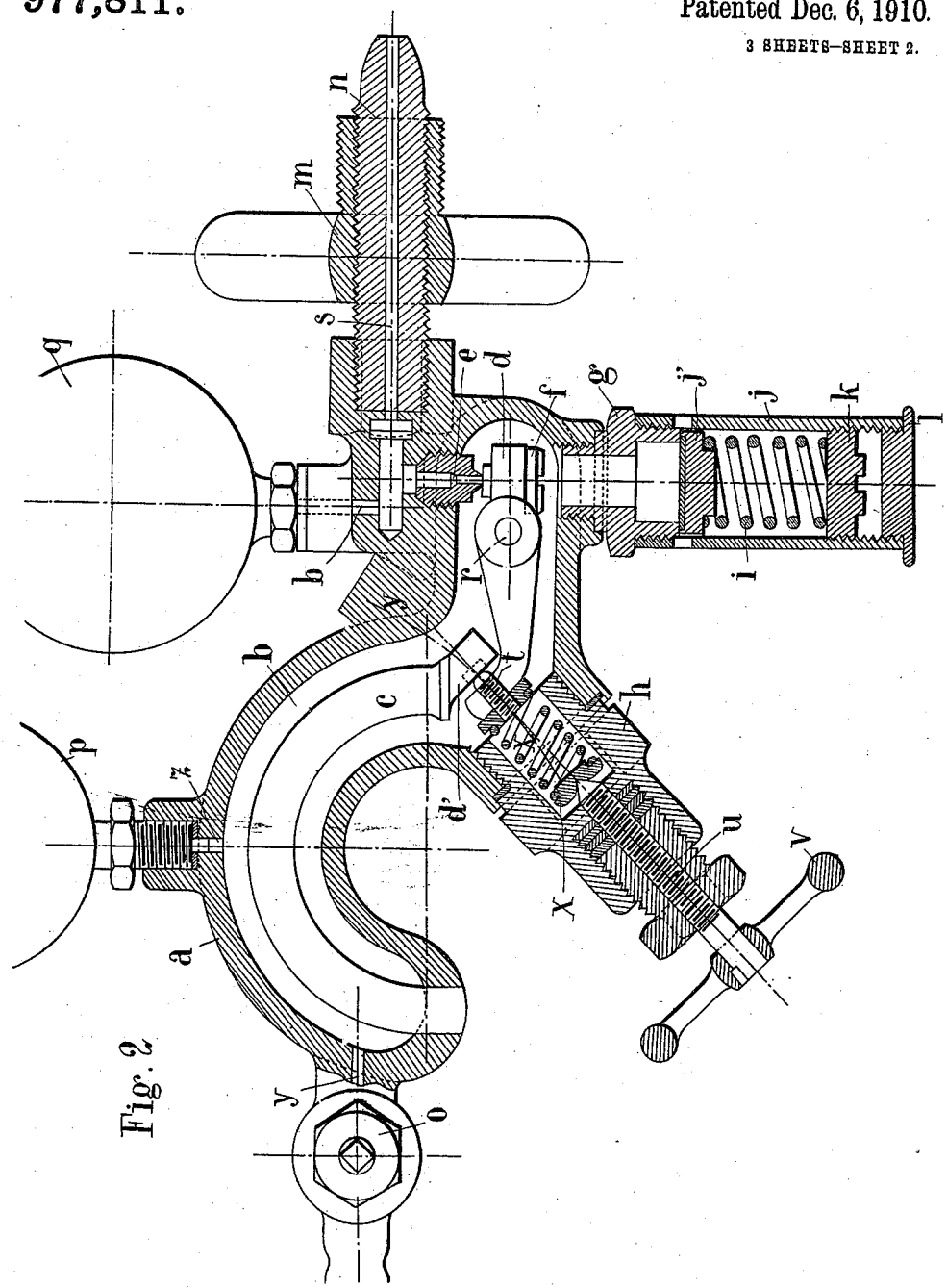

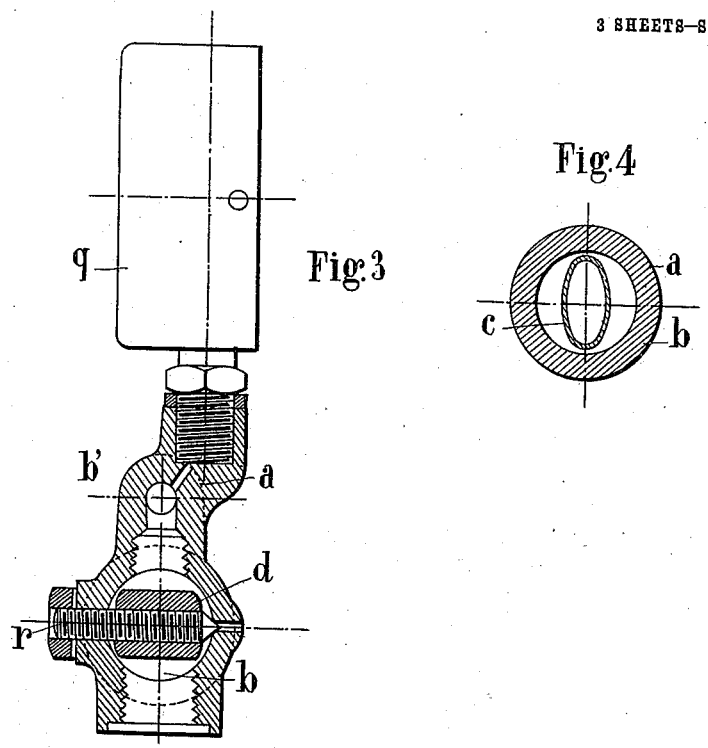
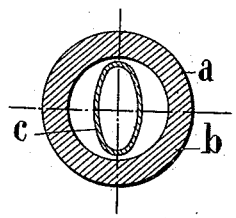
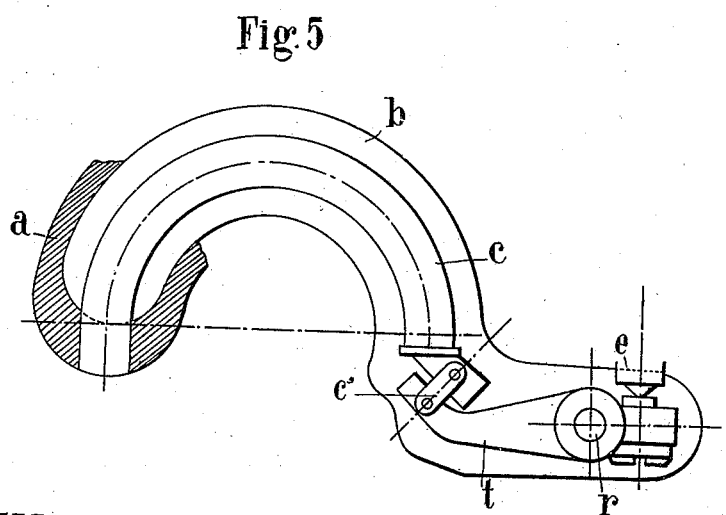

UNITED STATES PATENT OFFICE.

JACQUES MANDET, OF PARIS, FRANCE.

PRESSURE-REGULATOR.

977,811.  Specification of Letters Patent.  Patented Dec. 6, 1910.

Application filed May 26, 1909. Serial No. 498,533.

*To all whom it may concern:*

Be it known that I, JACQUES MANDET, a citizen of the Republic of France, and resident of Paris, France, post-office address 6 Rue de l'Hermitage, have invented a new and useful Improvement in Pressure-Regulators, which improvement is fully set forth in the following specification.

The apparatus generally termed regulators expanders mano-expanders reducers, etc., heretofore employed for expanding gases or fluids under pressure such as steam air oxygen hydrogen acetylene carbonic acid nitrogen protoxid anhydrous ammonia ethylene and so forth and regulate its flow at a constant given pressure with a given constant supply then if necessary increase or decrease the expansion pressure and the supply and automatically cut off the flow of these gases or fluids under pressure when their expansion pressure has reached a given figure, comprise as their principal operative parts balanced valves pistons differential pistons metal membranes plastic membranes of leather india-rubber ebonite or the like metallic or flexible bellows and so forth. These parts transmit the efforts exerted upon their surface by the pressure of the expanded or the reduced gases to the admission orifice for the gases under pressure either directly or by a combination movement; these efforts are generally compensated by springs or counterweights.

The present invention has for its object an apparatus intended for expanding gases or fluids under pressure and regulate their flow its main feature residing in the fact that the parts previously enumerated are replaced by a metal tube of the Bourdon type.

The description hereinafter given of this apparatus and the drawings accompanying the same will explain by way of example the object of utilizing the physical and mechanical properties of the Bourdon tube for the expansion of gases under pressure rendering the flow of the expanded gases uniform and automatically confining the gases under pressure at a given expanded pressure.

In the accompanying drawing—Figure 1 shows the apparatus in outside elevation. Fig. 2 is a longitudinal section of the same on the line A—A in Fig. 1. Fig. 3 is a cross section on the line B—B in Fig. 1. Fig. 4 is a cross section on the line C—C in Fig. 1.
Fig. 5 is a detail view partially in section, showing a different form of connection between the tube and lever.

In the first four figures $m$ $n$ indicate a connection enabling the apparatus to be fitted to a reservoir under pressure.

$s$ is the conduit for the supply of the gases under pressure; $e$ is a screwed valve seat forming a tight joint; $d$ is a lever rocking on a pivot $r$ its small arm carrying a valve $f$ which serves as an obturator on the bearing zone of the seat $e$.

$c$ is a metal tube of the Bourdon type closed at its extremity by the plug $d'$ (the other extremity is soldered or otherwise fixed to the body $a$ and the inner part of this tube should not be in communication with the expansion chamber $b$); $x$ is a spring the pressure of which is regulated by means of a screwed rod $u$ screwed on to the part $h$ which is itself fixed upon the body $a$. A tight joint for the rod $u$ which is operated by the hand wheel $v$ is obtained by means of a stuffing box or in some other convenient manner.

The conduit $b'$ places the conduit $s$ for the gases under pressure to be expanded in communication with a pressure recorder in the present case the pressure gage $q$. The conduit $z$ places the expansion chamber $b$ in communication with a pressure recorder as for instance the pressure gage $p$. The conduit $y$ serves to connect the expansion chamber with a supply cock $o$.

$g$ is a plug screwed to the body $a$ which acts as a safety valve seat for the expansion chamber and which also enables the valve $f$ to be readily inspected.

$i$ is a spring the tension of which is regulated by means of the screw $k$ which bears upon the body $j$.

$j'$ is a safety valve.

$t$ is a screw enabling the extremity of the tube $c$ to be supported. This screw bears upon the lever $d$.

The apparatus mounted in the manner illustrated and connected with the reservoir of gas under pressure which is to be expanded operates in the following manner. The gas at high pressure reaches the seat $e$ and the valve $f$ which is closed in passing along the conduit $s$. This closing is effected by means of the screw $t$ which has been regulated when the apparatus was mounted. By screwing it up its extremity encounters the plug $d'$ which offers a certain resistance; this resistance is transmitted to the lever $d$ which rocking at $r$ closes the valve and consequently obturates the inlet for the gas at high pressure. By means of the screw $u$ actuated by the hand wheel $v$ the spring $x$ is compressed and acts upon the extremity of the lever $d$ which rocks and lifting the valve $f$ uncovers the inlet for the gas at high pressure. This gas enters the chamber $b$ the supply cock $o$ of which is closed. The pressure in this chamber tends to balance with the pressure of the reservoir but this expanded pressure acts upon the outer walls of the metal Bourdon tube $c$. This tube by virtue of its properties and under the influence of the moment closes in describing a curve along the line $x$—$y$ and by means of its extremity or plug $d'$ transmits a movement and a force which are communicated to the lever $d$ by means of a screw $t$. This force added to the initial tension of the tube $c$ obtained by the tightening of the screw $t$ when the apparatus is mounted (which force is multiplied in the present case by the difference of the lever arms) overcomes the force imparted to the spring $x$ and owing to the rocking movement closes the valve upon the seat $e$ thus intercepting the admission of gas at high pressure. Assuming that at this moment the gas accumulated in the expansion chamber $b$ has a pressure of 20 kilos, for example indicated on the recording pressure gage $p$ if the supply cock $o$ is opened gas is discharged from the expansion chamber so that the pressure in this chamber diminishes immediately. This decrease of pressure acting upon the outer walls of the metallic Bourdon tube $c$ the latter effects the work previously indicated in the opposite direction that is to say it tends to open and press with less force upon the lever. The spring $x$ encountering less resistance the equilibrium is destroyed the lever is pressed and rocks and consequently opens the valve $f$ and the high pressure gas again enters the chamber until the expansion pressure has reached 20 kilos. The pressure of the expanded gas indicated by the pressure recorder will therefore always correspond to the tension given to the spring $x$ or counterweight. The least fall of pressure produced in the expansion chamber which fall is here caused by the opening of the cock will give a proportionate aperture of the valve $f$. The least increase of pressure produced in the expansion chamber which increase is here caused by closing the cock will give a proportionate closing.

In order to transmit the travel and the force accumulated by the metal Bourdon tube under the influence of the efforts exerted upon its outer walls by the pressure of expanded gas means other than the lever may be employed; any other mechanical combination fulfilling the same purpose may be employed.

Fig. 5 shows that it is possible to connect the metallic tubes $c$ with the lever arm by means of a rod $c'$ or by any other appropriate transmission.

Claims.

1. The combination with an expansion chamber having an inlet and outlet, of a Bourdon tube associated therewith, a valve controlling the inlet, a lever carrying the valve having a bearing against the free end of the tube, a spring for holding the lever against said tube, and means for varying the tension of the spring.

2. The combination with an expansion chamber having an inlet and outlet, of a Bourdon tube associated therewith, a valve controlling the inlet and having a bearing against the tube, and means for opposing a variable yielding resistance to the action of the tube.

3. The combination with an expansion chamber having an inlet and an outlet, of a hollow Bourdon tube located in the chamber and secured at one end to one wall thereof, said end being open and communicating with the space outside of the chamber, and a valve controlling the inlet and having a portion associated with the inner end of the tube.

4. In an apparatus for the expansion of gases, under pressure and for regulating their flow, the combination with an expansion chamber, of a C-shaped tube of the Bourdon type, a lever, an admission controlling valve for the fluid under high pressure carried by the lever, and a regulatable abutment lying against the free end of the C-shaped tube and associated with the lever, a regulatable spring holding the abutment against the end of the C-shaped tube, a safety valve in the expansion chamber, and an outlet pipe for the expanded fluid.

In testimony whereof I have signed this specification in the presence of two subscribing witnesses.

JACQUES MANDET.

Witnesses:
 EMILE LEDRET,
 H. C. COXE.